United States Patent
Kuo et al.

(10) Patent No.: US 9,760,985 B2
(45) Date of Patent: Sep. 12, 2017

(54) APPARATUS AND METHOD FOR HIGHLY ACCURATE REAL-TIME PHOTOELECTRIC GLASS SUBSTRATE IDENTIFICATION

(71) Applicant: Ta-Jen Kuo, Taipei (TW)

(72) Inventors: Ta-Jen Kuo, Taipei (TW); Ron Tsai, Taipei (TW)

(73) Assignee: TA-JEN KUO, Taipei (TW)

(*) Notice: Subject to any disclaimer, the term of this patent is extended or adjusted under 35 U.S.C. 154(b) by 70 days.

(21) Appl. No.: 14/831,929

(22) Filed: Aug. 21, 2015

(65) Prior Publication Data

US 2017/0004611 A1   Jan. 5, 2017

(30) Foreign Application Priority Data

Jul. 2, 2015   (TW) ................ 104121499 A

(51) Int. Cl.
  *G06K 9/46*   (2006.01)
  *G01N 21/00*   (2006.01)
  *G06T 7/00*   (2017.01)
  *G06T 7/70*   (2017.01)

(52) U.S. Cl.
  CPC ........... *G06T 7/0004* (2013.01); *G06T 7/70* (2017.01); *G06T 2207/30148* (2013.01)

(58) Field of Classification Search
  CPC ............ G06T 7/0004; G06T 7/004; G06T 2207/30148; G06T 7/001; G06T 2207/30141; H04N 5/372; H04N 5/2256
  USPC ....... 382/151, 140–148, 152, 190, 254, 275, 382/274, 305, 309, 312; 356/337, 494, 356/237.1, 239.2, 239.3, 239.7, 237.2, 356/237.4, 237.5, 255, 254, 908; 73/863.11; 177/1, 50, 3; 348/79, 86; 345/419
  See application file for complete search history.

(56) References Cited

U.S. PATENT DOCUMENTS

| 5,499,096 | A  | * | 3/1996 | Tamiya ............ | G01D 5/38 356/494 |
| 6,902,616 | B1 | * | 6/2005 | Yamazaki ......... | C30B 1/00 117/3 |
| 7,345,698 | B2 | * | 3/2008 | Abbott ............. | G01B 11/306 348/86 |
| 7,516,628 | B2 | * | 4/2009 | Chen ............... | G01B 11/0675 250/559.07 |

(Continued)

*Primary Examiner* — Sheela C Chawan
(74) *Attorney, Agent, or Firm* — Lin & Associates Intellectual Property, Inc.

(57) ABSTRACT

The present invention provides an apparatus for highly accurate and real-time photoelectric glass substrate identification. The apparatus includes: a laser device for emitting a laser beam; a glass substrate that has a first surface and a second surface and is configured to receive the laser beam to generate a first laser beam point and a second laser beam point; and, a charged coupled device (CCD) camera inspecting equipment. The first laser beam point has a first point area, and the second laser beam point has a second point area. Once the first point area is moved for a glass distance number and is aligned with the second point area, the CCD camera inspecting equipment can obtain a thickness value of the glass substrate with a resolution value and the glass distance number. In addition, the present invention also provides a method for highly accurate and real-time photoelectric glass substrate identification.

10 Claims, 3 Drawing Sheets

(56) References Cited

U.S. PATENT DOCUMENTS

| | | | |
|---|---|---|---|
| 8,027,036 B2* | 9/2011 | Kim | G01N 21/896 356/237.1 |
| 8,836,698 B2* | 9/2014 | Gabara | G06T 17/05 345/419 |
| 2014/0230577 A1* | 8/2014 | Cakmak | G01N 21/41 73/863.11 |

* cited by examiner

APPARATUS AND METHOD FOR HIGHLY ACCURATE REAL-TIME PHOTOELECTRIC GLASS SUBSTRATE IDENTIFICATION

CROSS-REFERENCE TO RELATED APPLICATION

This application claims the priority of Taiwanese patent application No. 104121499, filed on Jul. 2, 2015, which is incorporated herewith by reference.

BACKGROUND OF THE INVENTION

1. Field of the Invention

The present invention relates to an apparatus and method for highly accurate real-time photoelectric glass substrate identification, and more particularly, relates to an apparatus and method utilizing a digital signal processing (DSP) method to facilitate highly accurate real-time photoelectric glass substrate identification.

2. Description of Related Art

In industries such as the liquid crystal device (LCD), plasma display panel (PDP), organic light emitting diode (OLED), digital camera or smart phone industries in which display devices are applicable, glass material is commonly used as the substrate of various displays, and each glass material is widely applied in the manufacturing processes in a form of thin substrate. In addition, in areas of the pick-up head prism such as the bonding of silicon chips, micro electro mechanical systems (MEMS), MEMS of fiber optics device, biopharmaceutical areas, micro mirror, polarized beam splitter, substrates of dichroic filter, micro glass-block and lens, DVD and continuous data protection (CDP), a variety of glass substrates are also used.

Furthermore, in high-tech industries such as the semiconductor manufacturing equipment industry, precision machinery industry and display devices industry mentioned above, it is a trend to design products in nano-level with miniaturization and precision. Therefore, in the development process of manufacturing techniques, integration techniques and measuring equipment of the precision machinery area, inspecting techniques of the glass substrate thickness have become rather important.

In order to meet the measuring requirements of the precision machinery area, one of the conventional inspecting techniques utilizes the wavelength of lights to obtain the glass substrate thickness. However, in such a conventional technique of using the wavelength to measure glass thickness, not only is the set up difficult, but the cost of the precision equipment is also too high. Therefore, such a technique still has rooms for improvements.

On the other hand, because of the characteristics of high strength and high directionality of the laser beam, laser devices have also been used by some conventional techniques to measure glass thickness. However, such techniques often require multiple sets of laser light source, multiple sets of glass substrates and multiple sets of charged coupled device (CCD) camera inspecting equipment to perform the measurement. Hence, such techniques are disadvantageous in its high cost and its incapability to perform real-time inspection.

Therefore, there is an urgent need for the industry to develop an apparatus with a simplified structure that uses laser to inspect the thickness of glass substrates and a method thereof. It is preferable for such an apparatus and method to be able to lower the cost of the inspection equipment, increase the speed of the inspection process while performing real-time inspection.

SUMMARY OF THE INVENTION

Based on the above reasons, a primary objective of the present invention is to provide an apparatus for highly accurate and real-time photoelectric glass substrate identification. The apparatus includes: a laser device that is configured to emit a laser beam; a glass substrate that has a first surface and a second surface and is configured to receive the laser beam, wherein a first laser beam point is generated on the first surface, a second laser beam point is generated on the second surface, the laser beam generates a first reflecting light beam at the first laser beam point, and the laser beam generates a second reflecting light beam at the second laser beam point; and, a charged coupled device (CCD) camera inspecting equipment that is configured to receive the first reflecting light beam and the second reflecting light beam; wherein the first laser beam point has a first point area, the second laser beam point has a second point area, and the CCD camera inspecting equipment determines whether a position of the first point area and a position of the second point area are aligned with each other with the first reflecting light beam and the second reflecting light beam; if the position of the first point area and the position of the second point area are not aligned, a glass distance number is generated once the first point area is aligned with the second point area, and a thickness value of the glass substrate is obtained by the CCD camera inspecting equipment using a resolution value and the glass distance number.

Preferably, the resolution value is 2.5 μm-2.7 μm.

Preferably, the CCD camera inspecting equipment calculates a product of the resolution value and the glass distance number with a digital signal processing method.

Preferably, the laser beam has the characteristics of high monochromaticity, high directionality, high strength and high coherence.

Preferably, a unit of the first point area, the second point area and the glass distance number is pixel.

Another objective of the present invention is to provide a method for highly accurate real-time photoelectric glass substrate identification. The method includes: Step 1: emitting a laser beam to a glass substrate with a laser device; Step 2: receiving the laser beam with the glass substrate, generating a first laser beam point on a first surface of the glass substrate, and generating a second laser beam point on a second surface of the glass substrate, wherein the laser beam generates a first reflecting light beam at the first laser beam point, and the laser beam generates a second reflecting light beam at the second laser beam point; Step 3: receiving the first reflecting light beam and the second reflection light beam with a charged coupled device (CCD) camera inspecting equipment, wherein the first laser beam point has a first point area, and the second laser beam point has a second point area; Step 4: with the first reflecting light beam and the second reflecting light beam, determining whether a position of the first point area and a position of the second point area are aligned with each other using the CCD camera inspecting equipment; and, Step 5: if the position of the first point area and the position of the second point area are not aligned, generating a glass distance number once the first point area is aligned with the second point area, and obtaining a thickness value of the glass substrate by using a resolution value and the glass distance number with the CCD camera inspecting equipment.

Preferably, the resolution value is 2.5 μm-2.7 μm.

Preferably, in Step 4, the CCD camera inspecting equipment calculates a product of the resolution value and the glass distance number with a digital signal processing method.

Preferably, in Step 1, the laser beam has the characteristics of high monochromaticity, high directionality, high strength and high coherence.

Preferably, in Steps 4 and 5, a unit of the first point area, the second point area and the glass distance number is pixel.

Other purposes, advantages and innovative features of the present invention will be apparent to those skilled in the art by reading the detailed description in the following section, with reference to the attached drawings.

BRIEF DESCRIPTION OF THE DRAWINGS

The summary of the preferred embodiments of the present invention as described above will be best understood by reading the detailed description in the following section with reference to the attached drawings. In order to serve its illustrative purposes, each drawing depicts the preferred embodiments of the present invention. However, those skilled in the art should understand that the present invention is not limited to the exact configuration and equipment setup shown in the drawings.

DETAILED DESCRIPTION OF THE PREFERRED EMBODIMENT

The accompanying drawings are included to provide a further understanding of the invention, and are incorporated in and constitute a part of this specification. Same reference numbers represents identical or similar parts in all the drawings. It should be noted that the drawings are shown in a simplified manner and are not drawn according to the actual proportion.

Figure 1:
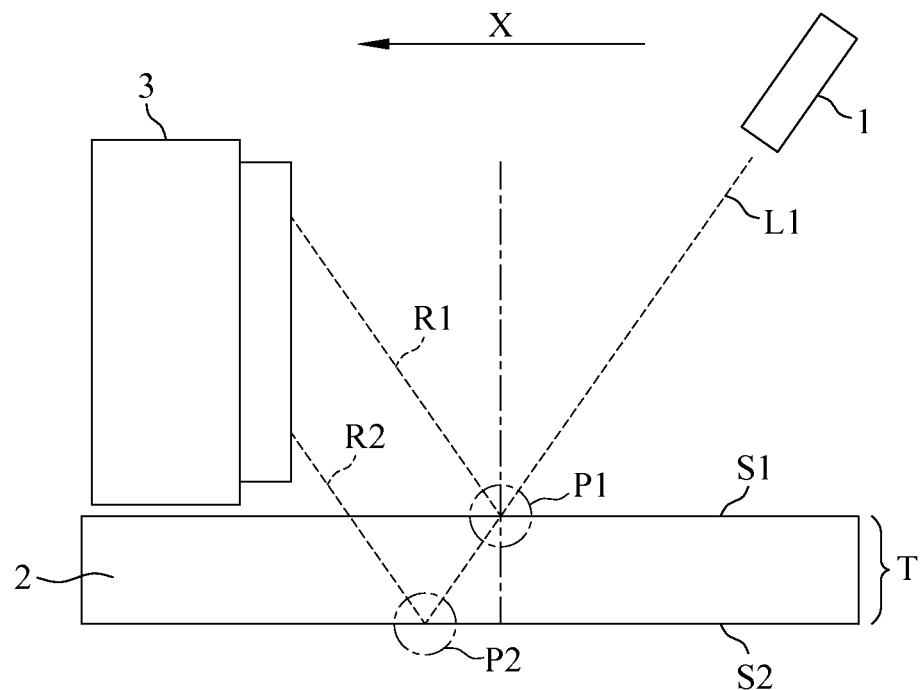
FIG. 1 is a schematic view illustrating the configuration of an apparatus for highly accurate real-time photoelectric glass substrate identification of the present invention.

FIG. 1 is a schematic view illustrating the configuration of an apparatus for highly accurate real-time photoelectric glass substrate identification of the present invention. As shown in FIG. 1, the apparatus for highly accurate real-time photoelectric glass substrate identification of the present invention includes a laser device 1, a glass substrate 2 and a charged coupled device (CCD) camera inspecting equipment 3. The laser device 1 is configured to emit a laser beam L1. The laser beam L1 has the characteristics of high monochromaticity, high directionality, high strength and high coherence. The glass substrate 2 has a first surface S1 and a second surface S2. The glass substrate 2 is configured to receive the laser beam L1. A first laser beam point P1 is generated on the first surface S1 and a second laser beam point P2 is generated on the second surface S2. The laser beam L1 generates a first reflecting light beam R1 at the first laser beam point P1, and the laser beam L1 generates a second reflecting light beam R2 at the second laser beam point P2. The CCD camera inspecting equipment 3 is configured to receive the first reflecting light beam R1 and the second reflecting light beam R2. The first laser beam point P1 and the second laser beam point P2 are not specified in the present invention and can be two arbitrary points. With the first laser beam point P1, the second laser beam point P2, the first reflecting light beam R1 and the second reflecting light beam R2, the present invention is able to measure a glass distance number between the signals at the first laser beam point P1 and the second laser beam point P2 using a digital signal processing (DSP) method, and is able to further calculate a thickness value T of the glass substrate with the measured glass distance number and a resolution value.

Figure 2:
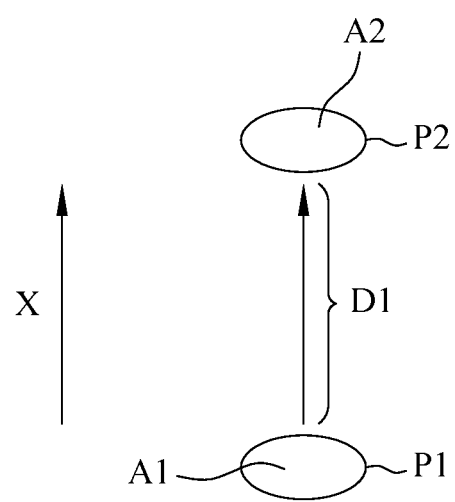
FIG. 2 is a schematic view illustrating a relationship between a first laser beam point P1 and a second laser beam point P2 of the present invention.

FIG. 2 is a schematic view illustrating a relationship between a first laser beam point P1 and a second laser beam point P2 of the present invention. Referring to FIG. 1 and FIG. 2, after the laser device 1 emits the laser beam L1, the first laser beam point P1 is generated on the first surface S1 and the second laser beam point P2 is generated on the second surface S2. The first laser beam point P1 and the second laser beam point P2 can be seen when viewing from the top of the glass substrate 2 along a X-axis direction; in addition, the first laser beam point P1 is located beneath the second laser beam point P2. In the apparatus for highly accurate real-time photoelectric glass substrate identification of the present invention, the first laser beam point P1 has a first point area A1, and the second laser beam point P2 has a second point area A2. In an embodiment of the present invention, the first point area A1 has an area of 2400 pixels, and the first point area A1 is larger than the second point area A2.

In the present invention, the first laser beam point P1 is moved along the X-axis direction until the first laser beam point P1 is aligned with the second laser beam point P2 on the first surface S1 and the second surface S2. During its moving process, the CCD camera inspecting equipment 3 determines whether a position of the first point area A1 is aligned with a position of the second point area by using the first reflecting light beam R1 and the second reflecting light beam R2. If the positions of the first point area A1 and the second point area A2 are not aligned, a glass distance number D1 will be generated once the first point area A1 is aligned with the second point area A2. Furthermore, the CCD camera inspecting equipment 3 will obtain the thickness value T of the glass substrate using the resolution value and the glass distance value D1. In one embodiment of the present invention, the resolution value is 2.7 μm; however, the resolution value can also be any number in the range of 2.5 μm to 2.7 μm in another embodiment of the present invention. Meanwhile, in one embodiment of the present invention, the CCD camera inspecting equipment 3 calculates the product of the resolution value and the glass distance number D1 with the DSP method to obtain the thickness value T of the glass substrate in a real-time manner; however, in another embodiment of the present invention, a CCD camera can be used alone to be connected to a processing terminal, so the processing terminal may process the resolution value and the glass distance number D1 with the DSP method to obtain the thickness value T of the glass substrate in a real-time manner.

In order to prove that the thickness value T of the glass substrate can be obtained by the present invention with a resolution value and a glass distance number D1, two sets of experimental data are used herein to explain the relationship between the resolution value and the glass distance number D1. The experiment utilizes the DSP method to facilitate the real-time calculation of the measured glass substrate thickness. First, the thicknesses of the two pieces of glasses used in the experiment are measured, and the results are 1.00 mm and 1.01 mm respectively with a glass thickness difference of 10 μm. Experiment 1 of the present invention is conducted to measure the glass substrate with the thickness of 1.00 mm, and Experiment 2 of the present invention is conducted to measure the glass substrate with the thickness of 1.01 mm.

Figure 3:
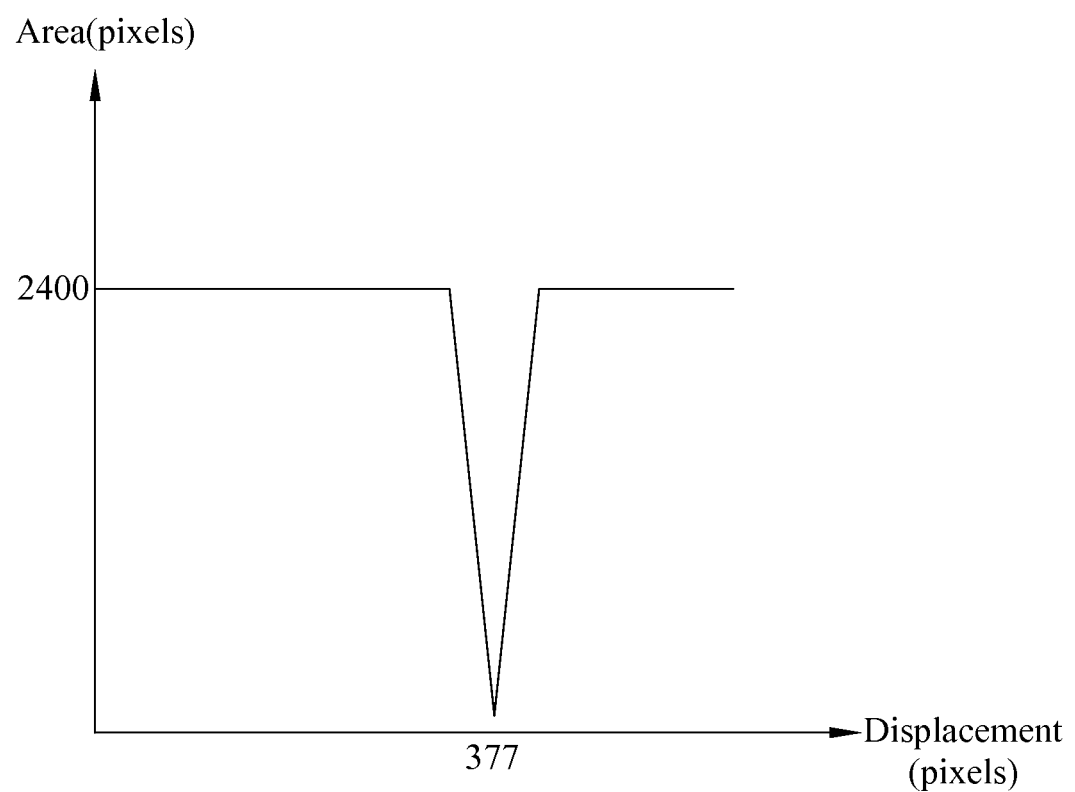
FIG. 3 is a X-Y graph illustrating a relationship between the displacement of the light beam and the area of the laser beam of the present invention.

FIG. 3 is a X-Y graph illustrating a relationship between the displacement of the light beam and the area of the laser beam of the present invention. Please refer to FIG. 1, FIG. 2 and FIG. 3, during the experimenting process, CCD camera inspecting equipment 3 calculates an area difference between the first laser beam point P1 and the second laser beam point P2 using the first laser beam point P1, the second laser beam point P2, the first reflecting light beam R1 and the second reflecting light beam R2 with the DSP method. The calculation result is plotted as a X-Y graph of the laser beam area versus the light beam displacement, as shown in FIG. 3. Herein, the first point area A1 has an area of 2400 pixels. In the experiments of the present invention, when the first point area A1 of the first laser beam point P1 slowly moves upward to be aligned with the second point area A2 of the second laser beam point P2, since the first laser beam point P1 has not been overlapped with the second laser beam point P2, the CCD camera inspecting equipment 3 was not able to calculate the overlapped area. At this time, the curve of the first laser point P1 is maintained at 2400 pixels. After the first laser beam point P1 has moved for a glass distance number D1, the first point area A1 of the first laser beam point P1 will be aligned with the second point area A2 of the second laser beam point P2. At this time, the curve of the first laser point P1 starts to change, and the displacement thereof falls to the position of 377 pixels, as shown in FIG. 3. Therefore, it could be known that the glass distance number D1 is 377 pixels.

After repeatedly conducting Experiment 1 and Experiment 2 as described above, the data shown in Table 1 below can be obtained.

TABLE 1

| Experiment 1 | | Experiment 2 | |
|---|---|---|---|
| Laser Beam Pixel (pixel) | Glass Distance Number (pixel) | Laser Beam Pixel (pixel) | Glass Distance Number (pixel) |
| 4097 | 377 | 3634 | 373 |
| 4086 | 377 | 3712 | 373 |
| 4143 | 377 | 3702 | 373 |
| 4014 | 377 | 3751 | 373 |

It can be learned from Table 1 that when the glass substrate thickness is 1.00 mm (Experiment 1), the first point area A1 of the first laser beam point P1 needs to move 377 pixels to be aligned with the second point area A2 of the second laser beam point P2; on the other hand, when the glass substrate thickness is 1.01 mm (Experiment 2), the first point area A1 of the first laser beam point P1 needs to move 373 pixels to be aligned with the second point area A2 of the second laser beam point P2. Once the above data are obtained, they are further sorted by the present invention to obtain the following conclusions. In Experiment 1, the calculated glass substrate thickness corresponding to each pixel is equal to $(1.00 \cdot 1000)/377 = 2.68$ (μ/pixel); similarly, in Experiment 2, the calculated glass substrate thickness corresponding to each pixel is equal to $(1.01 \cdot 1000)/373 = 2.707$ (μ/pixel). From here, it can be deduced that the resolution value of the present invention is 2.7 μm. In addition, from the results of Experiment 1 and Experiment 2 shown in Table 1, it can be learned that the difference between the glass thicknesses is 4 pixels. It should be noted that because the CCD camera inspecting equipment 3 can be adjusted to further change the pixel number calculated by the DSP method, the results of the experiments are changeable.

From the results of Experiment 1 and Experiment 2, it can be proved that the CCD camera inspecting equipment 3 of the apparatus for highly accurate real-time photoelectric glass substrate identification of the present invention is able to obtain the thickness value T of the glass substrate with a resolution value and the glass distance number D1. In other words, the present invention is able to provide an apparatus with a simplified structure that utilizes laser beams to perform highly accurate real-time photoelectric glass substrate identification. In such a way, the cost of the inspecting equipment can be significantly lowered, the inspecting speed can be notably increased, and the objective of real-time measurement can be achieved.

Figure 4:
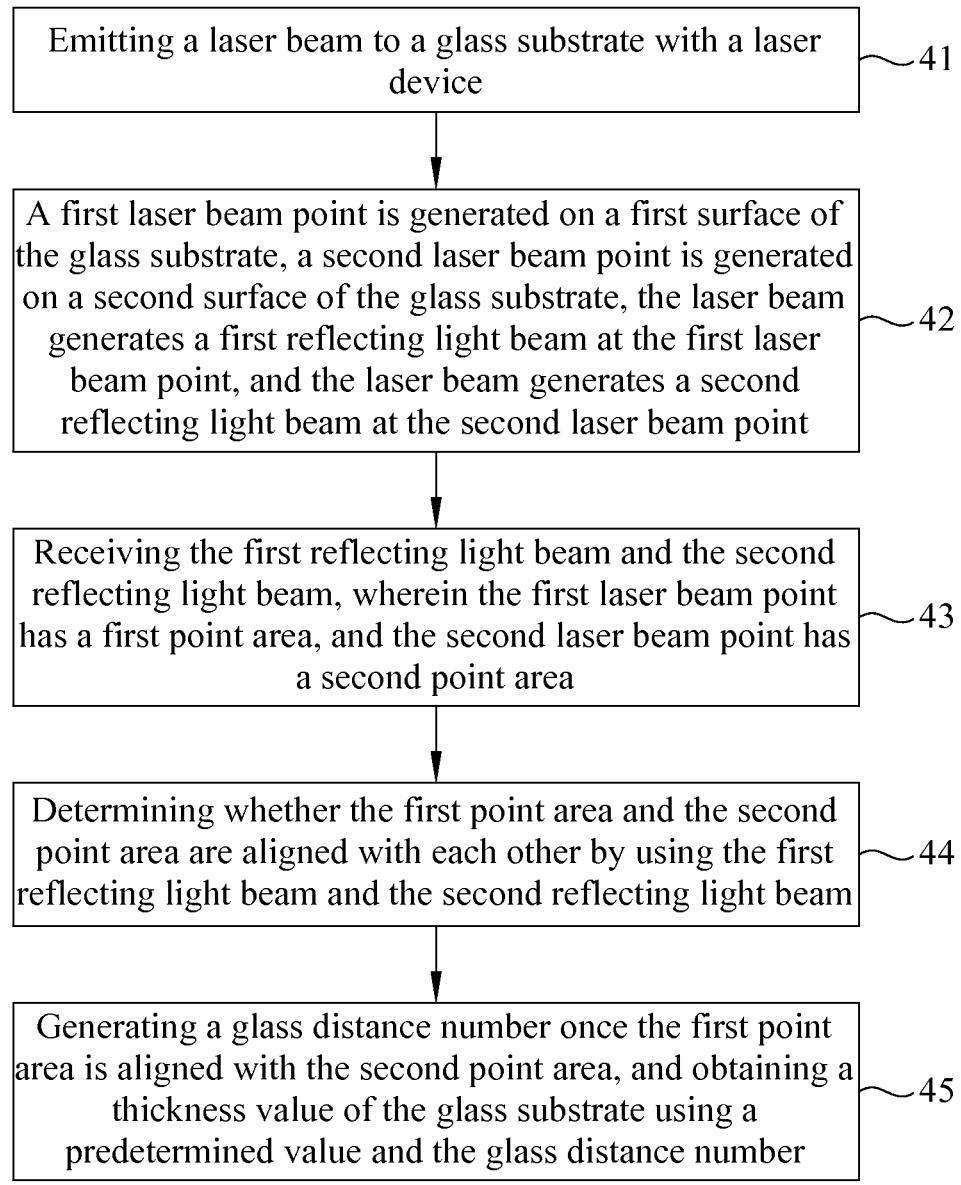
FIG. 4 is a flow diagram illustrating the steps of a method for highly accurate real-time photoelectric glass substrate identification of the present invention.

On the other hand, the present invention also provides a method for highly accurate real-time photoelectric glass substrate identification. FIG. 4 is a flow diagram illustrating the steps of a method for highly accurate real-time photoelectric glass substrate identification of the present invention. As shown in FIG. 4, the method for highly accurate real-time photoelectric glass substrate includes Step 41-Step 45, including: Step 41: emitting a laser beam to a glass substrate with a laser device; Step 42: receiving the laser beam with the glass substrate, generating a first laser beam point on a first surface of the glass substrate, and generating a second laser beam point on a second surface of the glass substrate, wherein the laser beam generates a first reflecting light beam at the first laser beam point, and the laser beam generates a second reflecting light beam at the second laser beam point; Step 43: receiving the first reflecting light beam and the second reflection light beam with a charged coupled device (CCD) camera inspecting equipment, wherein the first laser beam point has a first point area, and the second laser beam point has a second point area; Step 44: with the first reflecting light beam and the second reflecting light beam, determining whether a position of the first point area and a position of the second point area are aligned with each other using the CCD camera inspecting equipment; and, Step 45: if the position of the first point area and the position of the second point area are not aligned, generating a glass distance number once the first point area is aligned with the second point area, and obtaining a thickness value of the glass substrate with the CCD camera inspecting equipment using a resolution value and the glass distance number.

Similarly, from the method for highly accurate real-time photoelectric glass substrate identification, it can be known that the CCD camera inspecting equipment in the method for highly accurate real-time photoelectric glass substrate identification of the present invention is able to obtain the thickness value of the glass substrate with a resolution value and the glass distance number. In other words, the present invention is able to provide an apparatus with a simplified structure that utilizes laser beams to perform highly accurate real-time photoelectric glass substrate identification. In such a way, the cost of the inspecting equipment can be significantly lowered, the inspecting speed can be notably increased, and the objective of real-time measurement can be achieved.

Although the operation of the method according to the embodiments of the present invention has been described in a certain order, it is not meant to limit the order of the steps.

It should be apparent to those skilled in the art that the method can also be performed in a different order. Therefore, the order of the steps should not be seen as a limitation to the claims of the present invention. In addition, the method in the claims should not be limited by the order of steps described above. Those who are skilled in the art should understand that the order of the steps can be changed without departing from the scope of the present invention.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. An apparatus for highly accurate real-time photoelectric glass substrate identification, comprising:
 a laser device configured to emit a laser beam;
 a glass substrate having a first surface and a second surface and configured to receive the laser beam, wherein a first laser beam point is generated on the first surface, a second laser beam point is generated on the second surface, the laser beam generates a first reflecting light beam at the first laser beam point, and the laser beam generates a second reflecting light beam at the second laser beam point; and
 a charged coupled device (CCD) camera inspecting equipment configured to receive the first reflecting light beam and the second reflecting light beam;
 wherein the first laser beam point has a first point area, the second laser beam point has a second point area, and the CCD camera inspecting equipment determines whether a position of the first point area and a position of the second point area are aligned with each other with the first reflecting light beam and the second reflecting light beam by moving the first laser beam point until the first laser beam point on the first surface is aligned with the second laser beam point on the second surface; if the position of the first point area and the position of the second point area are not aligned, a glass distance number is generated once the first point area is aligned with the second point area, and a thickness value of the glass substrate is obtained by the CCD camera inspecting equipment using a resolution value and the glass distance number, the glass distance number being the distance that the first laser beam point is moved so as to align the first point area with the second point area.

2. The apparatus for highly accurate and real-time photoelectric glass substrate identification according to claim 1, wherein the resolution value is 2.5 μm-2.7 μm.

3. The apparatus for highly accurate and real-time photoelectric glass substrate identification according to claim 1, wherein the CCD camera inspecting equipment calculates a product of the resolution value and the glass distance number with a digital signal processing method.

4. The apparatus for highly accurate and real-time photoelectric glass substrate identification according to claim 1, wherein the laser beam has the characteristics of high monochromaticity, high directionality, high strength and high coherence.

5. The apparatus for highly accurate and real-time photoelectric glass substrate identification according to claim 1, wherein a unit of the first point area, the second point area and the glass distance number is pixel.

6. A method for highly accurate and real-time photoelectric glass substrate identification, comprising:
 Step 1: emitting a laser beam to a glass substrate with a laser device;
 Step 2: receiving the laser beam with the glass substrate, generating a first laser beam point on a first surface of the glass substrate, and generating a second laser beam point on a second surface of the glass substrate, wherein the laser beam generates a first reflecting light beam at the first laser beam point, and the laser beam generates a second reflecting light beam at the second laser beam point;
 Step 3: receiving the first reflecting light beam and the second reflection light beam with a charged coupled device (CCD) camera inspecting equipment, wherein the first laser beam point has a first point area, and the second laser beam point has a second point area;
 Step 4: with the first reflecting light beam and the second reflecting light beam, determining whether a position of the first point area and a position of the second point area are aligned with each other using the CCD camera inspecting equipment by moving the first laser beam point until the first laser beam point on the first surface is aligned with the second laser beam point on the second surface; and
 Step 5: if the position of the first point area and the position of the second point area are not aligned, generating a glass distance number once the first point area is aligned with the second point area, and obtaining a thickness value of the glass substrate by using a resolution value and the glass distance number with the CCD camera inspecting equipment, the glass distance number being the distance that the first laser beam point is moved so as to align the first point area with the second point area.

7. The method for highly accurate and real-time photoelectric glass substrate identification according to claim 6, wherein in Step 5, the resolution value is 2.5 μm-2.7 μm.

8. The method for highly accurate and real-time photoelectric glass substrate identification according to claim 6, wherein in Step 4, the CCD camera inspecting equipment calculates a product of the resolution value and the glass distance number with a digital signal processing method.

9. The method for highly accurate and real-time photoelectric glass substrate identification according to claim 6, wherein in Step 1, the laser beam has the characteristics of high monochromaticity, high directionality, high strength and high coherence.

10. The method for highly accurate and real-time photoelectric glass substrate identification according to claim 6, wherein in Steps 4 and 5, a unit of the first point area, the second point area and the glass distance number is pixel.

* * * * *